Dec. 13, 1955  O. E. SAARI  2,726,455
MASTER GEAR AND CHECKING MACHINE
Filed April 30, 1953  2 Sheets-Sheet 1
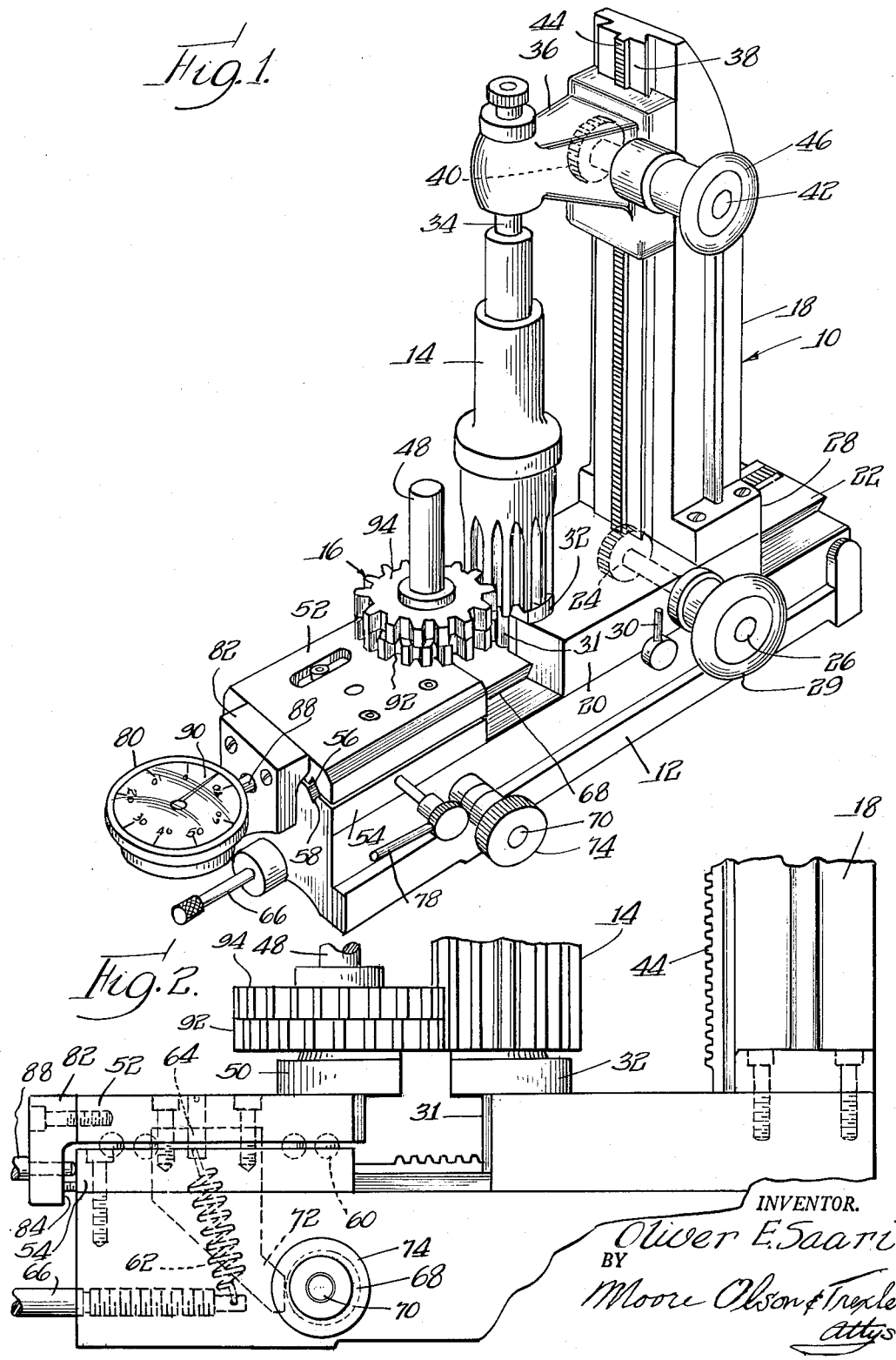
INVENTOR.
Oliver E. Saari
BY
Moore, Olson & Trexler
Attys.

Dec. 13, 1955  O. E. SAARI  2,726,455
MASTER GEAR AND CHECKING MACHINE
Filed April 30, 1953  2 Sheets-Sheet 2
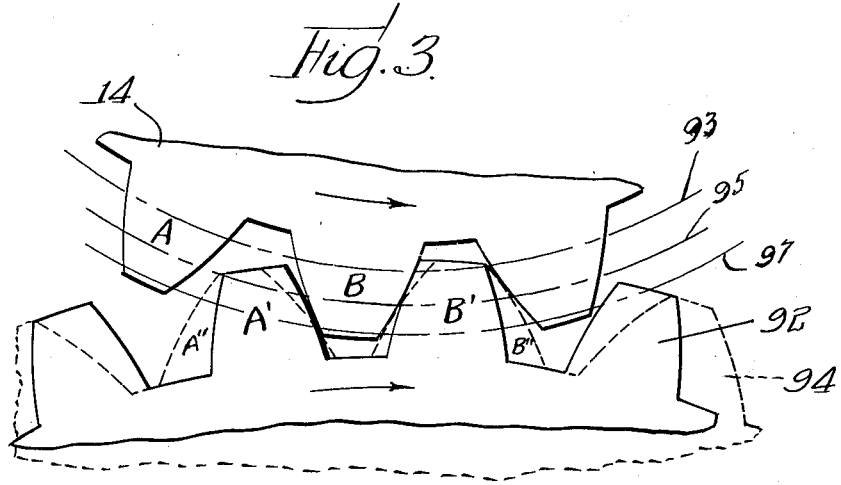
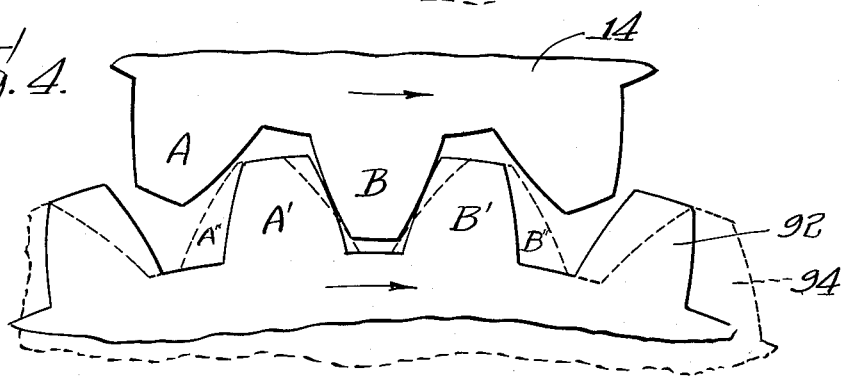
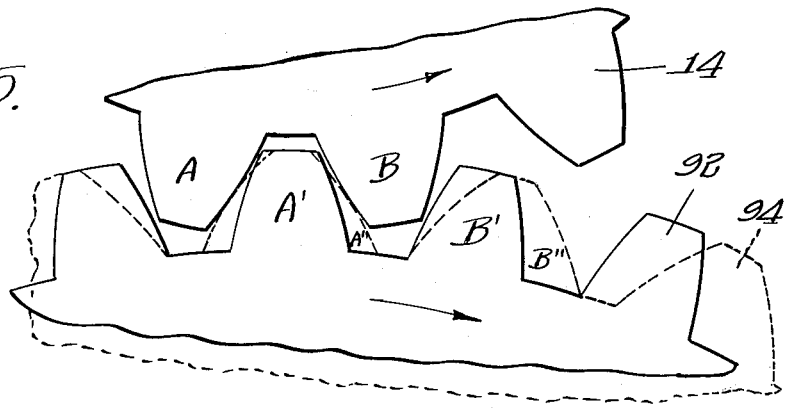
INVENTOR.
Oliver E. Saari
BY
Moore, Olson & Trexler
Attys.

United States Patent Office 2,726,455
Patented Dec. 13, 1955

2,726,455

MASTER GEAR AND CHECKING MACHINE

Oliver E. Saari, Chicago, Ill., assignor to Illinois Tool Works, Chicago, Ill., a corporation of Illinois Application April 30, 1953, Serial No. 352,243

6 Claims. (Cl. 33—179.5)

The present invention relates to a novel testing method and apparatus and more particularly to a novel method and apparatus for testing splines or gears having involute teeth.

Various devices have been devised for testing or checking work pieces having involute teeth, but these devices have been subject to several disadvantages. With some of the prior art devices the testing operation is too slow while other devices merely give a comparative test and not a positive test so that the operator may know that something is wrong, but not what is wrong. In addition, some prior art devices will not operate satisfactorily for checking stub involute teeth such as the involute teeth of a spline. More particularly some prior art devices have incorporated a master gear mounted for meshing engagement with a gear to be checked, so as to actuate a suitable indicator mechanism to show variations in accuracy of the work piece. However, such prior art master gears have been unsatisfactory for checking splines since they have had insufficient carry-over to provide smooth rolling contact with the short teeth of a spline. The result of such broken rolling contact is a violent movement of the indicator mechanism which makes the testing operation slow and cumbersome.

It is a primary object of this invention to provide a novel method and apparatus for testing work pieces having short involute teeth relatively quickly and easily.

Another object of this invention is to provide a novel method and apparatus for obtaining a rapid and positive check for size, runout, and over-all accuracy of substantially the entire involute profile of the work piece teeth.

Another object of this invention is to provide a novel apparatus of the above described type having master gear means meshing with the work piece and an indicator mechanism, by which apparatus smooth operation of the master gear means and indicator mechanism is obtained.

A more specific object of this invention is to provide novel master gear means for an apparatus of the above described type, which gear means is capable of smooth rolling contact with a work piece having short teeth and of checking substantially the entire involute profile of the work piece teeth.

Other objects and advantages of the present invention will become apparent from the following description and the accompanying drawings, wherein—

Fig. 1 is a perspective view of an apparatus embodying the novel features of this invention;

Fig. 2 is a fragmentary side elevational view of the apparatus of this invention;

Figs. 3 through 5 are enlarged fragmentary plan views illustrating the method of operation of the novel gear means of this invention.

Referring now more specifically to the drawings, wherein like parts are designated by the same numerals throughout the various figures, an apparatus 10 embodying the principles of this invention is illustrated in Figs. 1 and 2. The apparatus 10 includes a base 12 adapted to rest on any suitable support, not shown. Means are provided for supporting a work piece, such as a spline shaft 14 and master gear 16, on the base for rotation about parallel axes. The master gear means and spline are also mounted for movement toward and away from each other so that upon rotation thereof the distance between their parallel axes will vary in accordance with any inaccuracies in the shape and size of the spline. Suitable means described below is provided to indicate such variations in the distance between the axes of the spline and the master gear means and, thus, to indicate any variations of the size and shape of the spline.

The means for supporting the spline 14 includes a standard 18 mounted on a carriage 20, which carriage is slidably supported on the base 12. The carriage 20 is guided for movement on the base of a dovetail slide 22 fitting within a suitable groove in the carriage. A gear 24 is mounted in the carriage by a shaft 26 for meshing engagement with a rack 28 on the base so that upon rotation of the gear 24 the position of the carriage may be adjusted as desired. A suitable hand knob 29 is secured on the outer end of the shaft 26 for rotating the gear 24. The carriage 20 may be held at the desired position by suitable locking means, not shown, which locking means is controlled by a lever 30.

The lower end of the spline shaft 14 is supported on the carriage 20 by a suitable tailstock center 31 mounted in bearing means 32. The upper end of the spline shaft is held by a suitable head stock center 34. In order to permit the apparatus to accommodate work pieces of considerably different lengths, the head stock center is mounted in a carriage 36, which carriage is slidably mounted on the standard 18 by means of a dovetail slide 38. The carriage 36 includes a gear 40 mounted on a shaft 42 for engagement with a rack 44 on the standard, whereby the carriage may be adjusted to the height desired. A suitable hand knob 46 is secured to the outer end of the shaft 42 for actuating the gear 40.

The novel master gear means 16 of this invention is mounted on a mandrel 48, which mandrel is rotatably mounted in a suitable bearing member 50 secured to a slide plate 52 so that the master gear means is movable toward and away from the spline. The plate 52 is slidably mounted on a block 54 secured to the base 12 by suitable means. In the illustrated apparatus the plate 52 and the block 54 are provided with aligned longitudinally disposed V-grooves 56 and 58, respectively, adapted to contain a plurality of ball bearings 60. While the V-grooves are shown at only one side of the apparatus, it will be understood that similar grooves and ball bearings are also provided at the opposite side of the apparatus. The slide plate 52 is yieldably biased toward the spline by spring means 62 so that the master gear means yieldably engages the spline. The spring 62 is connected at its upper end to the slide plate 52 by a pin 64 and at its lower end to an adjustable threaded rod 66. The rod 66 is threaded into a suitable aperture in the base 12, and by adjusting the rod the apparatus may be adapted for use with master gears of various diameters.

In order to provide means for holding the master gear out of engagement with the spline to permit removal or replacement of the spline, or for any other desired purpose, an eccentric cam 68 is mounted within the base 12 on a shaft 70. The cam is engageable with a cam follower 72 secured to the slide plate and is actuated by a hand knob 74 fixed on the outer end of the shaft 70. Suitable locking means, not shown, is provided for locking the slide plate 52 relative to the block 54, which locking means is actuated by the lever 78. The plate 52 is locked during initial adjustment of the apparatus so that the correct center distance between the mandrel 48 and the head and tailstock centers can be obtained. It is, of course, understood that the base 12 and the block 54 are provided with suitable cavities for receiving the spring and the cam means.

As set forth hereinabove, any inaccuracies in the work piece or spline are determined by rolling the master gear means 16 and the spline together so that when the master gear means contacts an inaccurate portion of the spline, the master gear means and slide plate 52 move either toward or away from the spline. This movement may be measured by any suitable means such as an indicator 80. In the illustrated apparatus the indicator is mounted secured to the slide plate 52 by means of a bracket 82. The bracket is recessed, as at 84, in order to space the bracket from the carriage member 54 as shown best in Fig. 2. Movement of the bracket toward the block 54 is limited by a set screw 86. A plunger 88 extends through a suitable aperture in the bracket 82 for engagement with the end of the block 54. This plunger is resiliently urged toward the carriage member by suitable means within the body of the indicator 80 and is operatively connected with a pointer 90 so that as the plate 52 slides relative to the block 54, the plunger actuates the pointer. A dial calibrated in any desired manner is mounted in the indicator for cooperation with the pointer to show the condition of the work piece being tested.

A feature of this invention resides in the novel structure of the master gear means. This gear means includes a primary gear 92 which is keyed or otherwise fixed to the mandrel 48 and a carry-over gear 94 is rotatably mounted on the mandrel so as to be rotatable relative to the gear 92. The gears 92 and 94 may be mounted in various ways as long as they are concentric and rotatable relative to each other. The gears 92 and 94 preferably have substantially equal diameters. However, as shown best in Fig. 1, the primary gear 92 is provided with a larger number of teeth than the gear 94. The teeth of the gears 92 and 94 are of generally involute shape in order to have proper contact with the involute teeth of the spline or other work piece.

In order to check the entire involute profile of the spline teeth, the teeth of the primary gear 92 are undersize so that they roll with a spline pitch circle 93 which is undersize with respect to the nominal spline pitch circle 95 (see Fig. 3). In addition, the primary gear teeth have a tooth thickness such that the primary gear has simultaneous contact on both sides of a spline tooth with no backlash at a given distance between centers of the spline and primary gear. Since the small teeth of the primary gear have insufficient carry-over to provide uninterrupted engagement with the spline, the checking operation would be relatively slow if the primary gear were used alone. It has been found that substantially smooth and rapid checking operation is obtained by providing the above mentioned carryover gear which has fewer teeth than the primary gear and, therefore, rotates at a higher speed. The teeth of the gear 94 are oversized so that they roll with an oversize pitch circle 97 on the spline, and these teeth have a tooth thickness such that the carryover gear has simultaneous contact with the spline tooth spaces at the above mentioned center distance, thereby preventing sudden and violent movements of the master gear means toward the spline during the intervals when the primary gear teeth are out of contact with the spline. As will be understood by those familiar with the gear art, neither the undersize primary gear or the oversize carryover gear can, by themselves, rotate smoothly with the splines. However, by combining these gears in the manner set forth, the primary and carryover gears are alternately in smooth rolling contact with the spline so that, in effect, continuous smooth operation is obtained.

The operation of the apparatus described above is as follows. The indicator mechanism is first set so the pointer registers with the zero mark on the dial. This is accomplished by placing a standard spline or work piece having known and desired dimensions and bringing the master gear means into meshing engagement with the standard spline. The dial of the indicator is then rotated so that the zero mark registers with the pointer. The standard spline is then replaced by a work piece to be tested, and the work piece is rotated by hand. As the work piece is rotated, the master gears 92 and 94 are driven so that the teeth of the gear 92 successively contact the teeth of the spline to check the accuracy thereof. Any variation of the size and shape of the spline will cause the master gear means and slide plate 52 to move either toward or away from the spline, thereby actuating the indicator mechanism.

The action of the novel master gear of this invention is best illustrated in Figs. 3 through 5. In Fig. 3, the spline 14 is shown as being rotated in a counter clockwise direction with a tooth B of the spline in driving engagement with a tooth B' of the primary gear 92 and a tooth B'' of the gear 94. In this position, the teeth A' and B' engage opposite sides of the spline tooth B while the tooth A'' has not yet contacted the spline. In Fig. 4, the parts have advanced slightly and the tooth B of the spline is still in contact with the teeth A' and B' of the primary gear and B'' of the carry-over gear, and because of the difference in shape of the teeth B' and B'' the gear 94 has now advanced slightly relative to the gear 92.

In Fig. 5, the parts have been rotated to the point where the spline tooth B no longer is in driving contact with the primary gear tooth B'. It should be noted that in this position the spline tooth A still has not come into contact with the primary gear tooth A'. However, since the carry-over gear tooth A'' is in contact with both teeth A and B of the spline, the distance between the centers of the spline and master gear means is maintained by the carry-over gear until further rotation brings the spline tooth A into contact with the primary gear tooth A' and disengaged the carryover gear tooth A'' from the spline tooth B so that the carryover gear does not interfere with the checking operation of the primary gear. In other words, the primary gear is operable to engage simultaneously both sides of a spline tooth and the carryover gear is operable to engage both sides of a spline tooth space but only one of these gears engages two sides at one time. This alternate meshing engagement of the primary and carryover gears is made possible by the fact that they have a different number of teeth so that they are rotated relative to each other. With the parts in the position shown in Fig. 5, it is seen that the undersized primary gear tooth 102 extends substantially to the bottom of the spline tooth involute profile without interference and, thus, is capable of checking the entire involute surface.

From the above description, it is seen that the present invention has provided a novel method and apparatus, whereby relatively short involute teeth of a work piece, such as a spline, may be quickly and easily checked for size, runout, and over-all accuracy. More specifically, it is seen that this invention provides a novel master gear means capable of checking the entire involute profiles of spline teeth while maintaining continuous contact with the spline teeth, thereby preventing violent movements in the indicator mechanism.

While the preferred embodiment has been shown and described herein, it is obvious that many details may be changed without departing from the spirit and scope of the appended claims.

I claim:

1. An apparatus for testing work pieces having involute teeth, comprising master gear means, means for supporting said master gear means and a work piece for meshing engagement and for movement toward and away from each other, said master gear means including a gear having a plurality of undersized teeth for checking substantially the entire involute surfaces of the work piece teeth, and a second gear freely rotatable relative to and concentric with said first mentioned gear and having a plurality of oversized teeth for providing in combination with said undersized teeth substantially continuous contact between said master gear means and at least two tooth sides of the work piece, thereby to obtain substantially smooth operation of the apparatus.

2. In an apparatus for testing work pieces having involute teeth, master gear means including a primary gear having a plurality of undersized teeth for checking substantially the entire involute surfaces of the work piece teeth, and a carryover gear concentric with and rotatable relative to said primary gear and having a plurality of oversized teeth for obtaining in combination with said primary gear substantially continuous contact between the master gear means and at least two tooth surfaces of a work piece.

3. In an apparatus for testing work pieces having involute teeth, master gear means including a primary gear having a plurality of undersized teeth with adjacent primary gear teeth being simultaneously engageable with both sides of a work piece tooth for checking substantially the entire involute surfaces of the work piece tooth, and a carryover gear concentric with and rotatable relative to said primary gear and having a plurality of oversized teeth which are simultaneously engageable with both sides of a work piece tooth space for obtaining substantially continuous contact between the master gear means and at least two tooth sides of the work piece, said primary gear having a larger number of teeth than said carryover gear, and said undersized teeth and oversized teeth being alternately engageable with two tooth sides of the work piece.

4. An apparatus for testing workpieces having involute teeth comprising master gear means, means for supporting said master gear means and said workpiece for meshing engagement and for relative movement toward and away from each other, said master gear means including a gear having a plurality of undersized teeth for checking substantially the entire involute surfaces of the workpiece teeth, and a second gear freely rotatable relative to and concentric with said first mentioned gear and having a plurality of oversized teeth providing in combination with said undersized teeth substantially continuous contact between said master gear means and said workpiece, said first mentioned gear having a greater number of teeth than said second gear.

5. In an apparatus of the type described in claim 4 for testing workpieces having involute teeth, wherein the first and second gears constituting the master gear means have substantially equal outside diameters.

6. In an apparatus of the type described in claim 4 for testing workpieces having involute teeth, wherein said first mentioned gear having undersized teeth for checking the involute surfaces of the workpiece teeth is provided with an integral axially extending hub having an outer cylindrical surface which is concentric with an aperture provided in the gear blank and is adapted to accommodate the second gear for concentric mounting relative to said first gear.

References Cited in the file of this patent

UNITED STATES PATENTS

| | | |
|---|---|---|
| 1,222,392 | Green et al. | Apr. 10, 1917 |
| 1,445,631 | Lotz | Feb. 20, 1923 |
| 1,539,149 | Thornburg | May 26, 1925 |

FOREIGN PATENTS

| | | |
|---|---|---|
| 601,612 | Germany | Aug. 20, 1934 |